United States Patent [19]

Eckel

[11] 4,218,042
[45] Aug. 19, 1980

[54] BALL VALVE CONSTRUCTION

[75] Inventor: John D. Eckel, Hazelgreen, Wis.

[73] Assignee: A. Y. McDonald Mfg. Co., Dubuque, Iowa

[21] Appl. No.: 958,649

[22] Filed: Nov. 8, 1978

[51] Int. Cl.³ .............................................. F16K 5/06
[52] U.S. Cl. .................................. 251/288; 251/315; 29/434; 29/157.1 R
[58] Field of Search ............. 251/306, 308, 315, 288; 29/434, 157.1 R

[56] References Cited

U.S. PATENT DOCUMENTS

| | | | |
|---|---|---|---|
| 850,622 | 4/1907 | Clark | 251/308 |
| 982,815 | 1/1911 | Hobbs | 251/315 |
| 2,665,879 | 1/1954 | Housekeeper | 251/315 |
| 2,741,138 | 4/1956 | Russell | 251/315 |
| 2,855,177 | 10/1958 | Freeman | 251/315 |
| 3,096,786 | 7/1963 | Rost | 251/315 |
| 3,112,758 | 12/1963 | Norton | 251/315 |
| 3,288,430 | 11/1966 | Priese | 251/315 |
| 3,394,916 | 7/1968 | Birr | 251/315 |
| 3,498,585 | 3/1970 | Temple et al. | 251/315 |
| 3,567,178 | 3/1971 | Nelson | 251/315 |

Primary Examiner—William R. Cline
Assistant Examiner—H. Jay Spiegel

Attorney, Agent, or Firm—Wegner, Stellman, McCord, Wiles & Wood

[57] ABSTRACT

A ball valve including a valve housing having a fluid flow passage extending therethrough and terminating in ports for connection to a fluid conduit, the passage being intersected by an actuator opening in the housing a defining a valve chamber thereat, the opening having a shoulder intermediate its ends. An actuator is journalled in the opening and has a shaft including a threaded portion extending past the shoulder toward the chamber and terminating in a keyed-type end within the chamber and a nut of smaller size than one of the ports is threaded on the threaded portion after introduction into the chamber through the one port to retain the actuator on the housing. The nut bears against the shoulder. A valve ball has a bore extending therethrough and a keyway type groove in a side thereof. The ball is smaller than the one port and is disposed in the chamber by axial introduction through the port with the keyway type groove being oriented to slip fit about the keyed type end of the actuator shaft to couple the ball to the actuator. Stops are provided for limiting rotation of the actuator relative to the housing to prevent loosening of the nut and a fitting is received in the one port for narrowing the same to a size less than the ball to prevent loss of the ball through the port.

1 Claim, 3 Drawing Figures

BALL VALVE CONSTRUCTION

BACKGROUND OF THE INVENTION

This invention relates to valves, and more specifically to ball valves.

Over the years, many proposals for designs of ball valves have evolved. Many are relatively complex in terms of the number pf parts required as well as the manufacturing effort required to assemble the parts. As a consequence, while such valves are reliable, they are also expensive and the cost deters their use.

Other proposals have been advanced for ball valves of relatively simple construction. While such proposals overcome the expense and difficulty of fabrication encountered with complex valves, their reliability leaves much to be desired. All too typically, interconnected components may loosen during the process of a number of opening and closing valve cycles with the consequence that they may begin to leak or even become entirely inoperative should the actuator uncouple from the valve ball.

SUMMARY OF THE INVENTION

It is the principal object of the invention to provide a new and improved ball valve. More specifically, it is an object of the invention to provide a ball valve that is simple in construction and in fabrication and yet which is reliable thereby combining the benefits of low cost and high reliability.

An exemplary embodiment of the invention achieves the foregoing object in a ball valve construction including a valve housing having a fluid flow passage extending therethrough and terminating in ports for connection to a fluid conduit. The passage is intersected by an actuator opening in the housing and defines a valve chamber at the point of intersection. The opening has a shoulder intermediate its ends.

An actuator is journalled in the opening and has a shaft including a threaded portion extending past the shoulder toward the chamber and terminating in a keyed-type end within the chamber. A nut of smaller size than one of the ports is threaded on the threaded portion of the shaft after introduction into the chamber through the one port and retains the actuator on the housing. The nut bears against the shoulder. A valve ball having a bore extending therethrough and keyway type groove in one side thereof is provided and is smaller than the one port and is disposed in the chamber by axial introduction through the one port with the keyway-type groove being oriented to slip fit about the keyed-type end of the actuator shaft to thereby couple the ball to the actuator for rotation therewith. Means are also provided for limiting rotation of the actuator relative to the housing to prevent loosening of the nut. A fitting is received in the one port for narrowing the same to a size less than the ball to prevent egress of the ball from the chamber and valves seats are disposed on opposite sides of the chamber and about the ports.

In a highly preferred embodiment, the actuator shaft has a shoulder spaced from the threaded portion oppositely of the keyed-type end and there is further provided a seal disposed between the shaft shoulder and the shoulder in the opening.

A preferred embodiment also comtemplates that the rotation limiting means includes at least one projection from the housing extending axially relative to the opening with at least two spaced stop surfaces carried by the actuator and disposed in interference relation with the projection to be engaged thereby at desired extremes of rotation of the actuator relative to the housing.

Other objects and advantages will become apparent from the following specification taken in connection with the accompanying drawings.

DESCRIPTION OF THE PREFERRED EMBODIMENT

Figure 1:
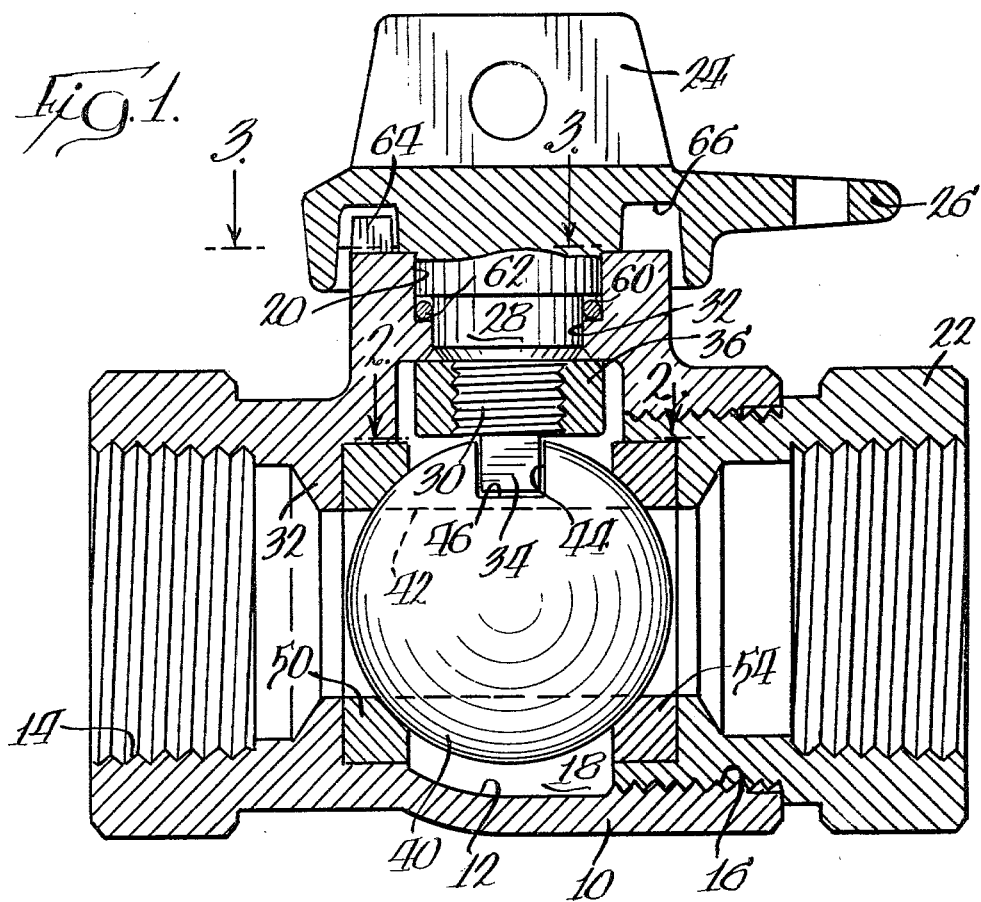
FIG. 1 is a sectional view of a ball valve made according to the invention.

An exemplary embodiment of a ball valve made according to the invention is illustrated in FIG. 1 and is seen to include a valve housing 10 formed of any suitable material, the precise nature of which is dependant upon the intended use of the valve. For example, the housing 10 could be formed of plastic, bronze, etc.

The housing 10 has a passage 12 extending therethrough to terminate in ports 14 and 16. Intermediate the ports 14 and 16, the passage 12 defines a valve chamber 18.

The housing 10 also includes an actuator opening 20 which intersects the passage 12 at right angles at the midpoint of the chamber 18.

The port 14 is internally threaded as illustrated for connection to a fluid conduit while the port 16 is larger in size than the port 14. It is also internally threaded so as to receive a fitting 22 for purposes to be seen.

An actuator 24 having a lockwing 26 is journalled in the opening 20 for rotation therein. One end of the actuator 24 terminates in a shaft 28 which includes a threaded portion 30. The threaded portion 30 extends past a shoulder 32 in the opening 20 toward the chamber 18 and terminates in a keyed-type end 34 of rectangular configuration as best seen in FIG. 2.

A nut 36 of considerably smaller size than the port 16 is introduced therethrough to be threaded on the threaded portion 30 of the shaft 28. In this respect, it will be noted that the keyed-type end 34 of the shaft 28 is smaller than the threaded portion 30 so as to allow the nut 36 to be slipped thereover. It will also be noted that that portion of the actuator opening 20 on the chamber side of the shoulder 32 is sufficiently large so as to enable the nut 36 to be rotated therein and onto the threaded portion 30.

A spherical valve ball 40 is of smaller size than the port 16 and may be introduced therethrough into the chamber 18. The valve ball 40 includes a through bore 42 which, as is well known in ball valves, is oriented to be co-axial with the passage 18 to allow fluid to flow therethrough. When the valve ball 40 is rotated approximately 90°, the bore 42 is disaligned with the axis of the passage 18 and thus halts fluid flow.

Figure 2:
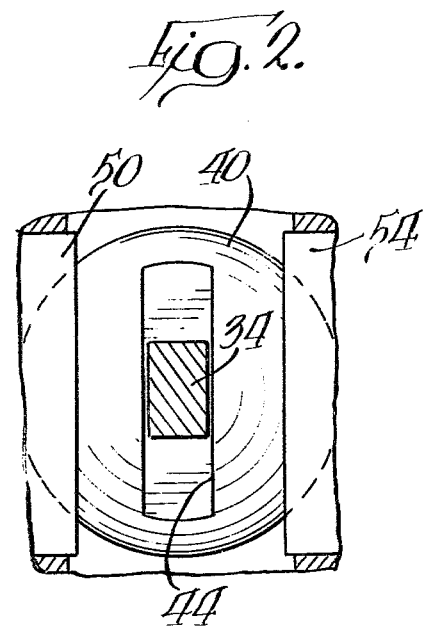
FIG. 2 is a fragmentary sectional view taken approximately along the line 2—2 of FIG. 1.

One side of the ball 40 is provided with a keyway-type groove 44 as seen in FIGS. 1 and 2. As best seen in FIG. 1, the bottom 46 of the groove 44 is planar as are the sides thereof and as seen in FIG. 2, the same is somewhat elongated. The dimensions of the groove 44 are such that it can slip fit over the keyed-type end 34 of the actuator shaft 28.

The ball 40 may be introduced into the chamber 18 through the port 16 but prior to that, a valve seat 50 of smaller size than the port 16 is introduced into the chamber 18 through the port 16 and lodged against the shoulder 52 in the passage 12 immediately adjacent to the port 14. Thereafter, the ball 40 is oriented with the slot 44 generally parallel to the axis of the passage 12 and introduced through the port 16 such that the groove 44 slip fits about the end 34 of the actuator shaft 28. The valve seat 50 can be introduced either before of after the nut 36 is disposed on the threaded portion 30 but of course, the ball 40 will not be so disposed in place until the nut 36 is in place.

Thereafter, the fitting 22, with a valve seat 54 already in place may be threaded into the port 16. It will be observed that the fitting 22 and valve seat 54 are of a size to narrow the port 16 to the point where the ball 40 is captured within the chamber 12.

If desired one or the other of the valve seats 50 and 54 could be formed integrally with the body 10 or fitting 22 as a spherical surface thereon, thus avoiding the need for separate insertion thereof.

Returning to the actuator 24, on the shaft 28 and spaced from the threaded portion 30 oppositely of the keyedtype end 34 is a shoulder 60. The shoulder 60 faces one side of the shoulder 32, namely, the side of the shoulder 32 remote from the chamber 18 and a seal such as an O-ring 62 is disposed between the two shoulders to seal the interface of the housing 10 and the actuator.

Figure 3:
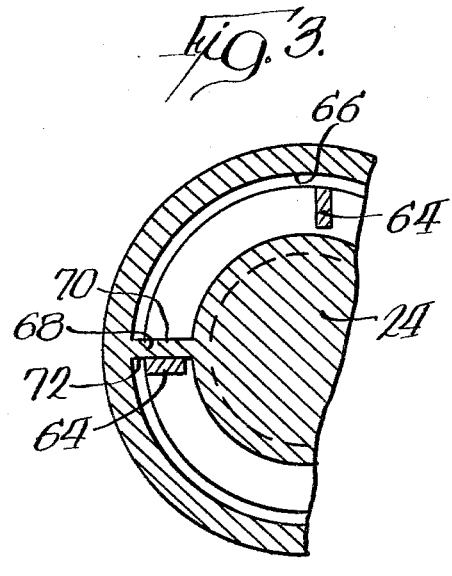
FIG. 3 is a fragmentary sectional view taken approximately along the line 3—3 of FIG. 1.

As seen in FIG. 1, an integral projection 64 extends generally axially of the opening 28 and away from the housing 10. The actuator 24 is provided with an annular groove 66, and as best seen in FIG. 3, at one point in the groove 66, there is a web 68 extending across the same. Opposite sides 70 and 72 of the web 68 define stop surfaces which are disposed in interference relation to the projection 64 to abut the same. If but a single projection 64 is utilized, the actuator 24 may be rotated through almost a full 360°, abutment of the surface 70 with the projection 64 halting travel in one direction and abutment of the surface 72 with the projection 64 halting rotation in the opposite direction.

Preferably, however, a wider single projection or two of the projections 64 are employed as illustrated in FIG. 3 and are so disposed as to limit rotation of the actuator 24 to 90°.

Because of the rotation limiting action provided by the just described components, there is insufficient relative rotation of the actuator and of the housing 10 to permit the nut 36 to loosen. Thus, sealing pressure on the O-ring 62 is continually maintained. At the same time, it is impossible for the nut 36 to become completely disengaged from the threaded portion 30 of actuator shaft 28 to allow the actuator 24 to uncouple from the ball 40. Thus, even after extending cycling of the valve, the components remain in tight assembled relation preventing leakage and in no event can they become disassembled to the point that the valve becomes inoperative.

Thus, the invention provides a simple ball valve construction having a minimal number of components and which may be easily and inexpensively fabricated. At the same time, the construction provides a high degree of reliability in terms of foreclosing both leakage and inoperability after repeated cycling.

What is claimed is:

1. A ball valve comprising:
    a valve housing having a fluid flow passage extending therethrough and terminating in ports for connection to a fluid conduit, said passage being intersected by an actuator opening in said housing and defining a valve chamber thereat, said opening having a shoulder intermediate its ends;
    an actuator journalled in said opening and having a shaft including a threaded portion extending past said shoulder toward said chamber and terminating in a keyed type end having planar sides within said chamber;
    a nut of smaller size than one of said ports threaded on said threaded portion after introduction into said chamber through said one port and retaining said actuator on said housing, said nut bearing against said shoulder;
    a valve ball having a bore extending therethrough and a keyway type groove having planar sides in a side thereof, said ball being smaller than said one port and being disposed in said chamber by axial introduction through said one port with said keyway type groove being oriented to slip fit about said keyed type end to couple said ball to said actuator for rotation thereby without restricting relative movement between said ball and said actuator along the axis of said rotation;
    means for limiting rotation of said actuator relative to said housing to prevent loosening of said nut;
    a fitting received in said one port for narrowing the same to a size less than said ball to prevent egress of said ball from said chamber; and
    valve seats on sides of said chamber and about said ports.

* * * * *